United States Patent
Parkinson et al.

(10) Patent No.: US 11,247,445 B2
(45) Date of Patent: Feb. 15, 2022

(54) MULTILAYER STRETCH HOOD COMPOSITIONS AND STRUCTURES

(71) Applicant: Dow Global Technologies LLC, Midland, MI (US)

(72) Inventors: Shaun Parkinson, Tarragona (ES); Jesus Nieto, Tarragona (ES); Rajen M. Patel, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 272 days.

(21) Appl. No.: 16/340,262

(22) PCT Filed: Oct. 12, 2017

(86) PCT No.: PCT/US2017/056275
§ 371 (c)(1),
(2) Date: Apr. 8, 2019

(87) PCT Pub. No.: WO2018/075324
PCT Pub. Date: Apr. 26, 2018

(65) Prior Publication Data
US 2020/0039199 A1 Feb. 6, 2020

(30) Foreign Application Priority Data
Oct. 18, 2016 (EP) .................................. 16382472

(51) Int. Cl.
*B32B 27/32* (2006.01)
*B32B 27/18* (2006.01)
(Continued)

(52) U.S. Cl.
CPC .............. *B32B 27/32* (2013.01); *B32B 27/18* (2013.01); *B32B 27/306* (2013.01);
(Continued)

(58) Field of Classification Search
None
See application file for complete search history.

(56) References Cited

U.S. PATENT DOCUMENTS 5,064,802 A 11/1991 Stevens et al.
5,153,157 A 10/1992 Hlatky et al.
(Continued)

FOREIGN PATENT DOCUMENTS

EP 681914 A1 11/1995
EP 2571690 B1 1/2014
(Continued)

OTHER PUBLICATIONS

Communication pursuant to Rules 161(1) and 162 EPC—dated Jun. 3, 2019 relating to European Patent Application No. 17787096.1.
(Continued)

*Primary Examiner* — Ramsey Zacharia
(74) *Attorney, Agent, or Firm* — Dinsmore & Shohl LLP

(57) ABSTRACT

Embodiments are directed to a stretch hood or stretch label multilayer film comprising a first skin layer, a second skin layer, and a core layer disposed between the first skin layer and the second skin layer, wherein: the first skin layer, the second skin layer, or both independently comprise at least 50 wt. % of a linear low density polyethylene (LLDPE) resin, wherein the skin LLDPE resin exhibits each of the following properties: a Crystallization Elution Fractionation (CEF) fraction of less than 8% above an elution temperature of 94° C.; and a melt index ($I_2$) of 0.1 to 2.0 g/10 min when measured according to ASTM D 1238 at a load of 2.16 kg and temperature of 190° C. The core layer comprises a polyethylene resin having a wt. % crystallinity of from 10% to 40% and a single melting peak as measured by differential scanning calorimetry.

14 Claims, 4 Drawing Sheets

(51) Int. Cl.
  *B32B 27/30* (2006.01)
  *B65B 67/08* (2006.01)
(52) U.S. Cl.
  CPC ..... *B32B 2250/03* (2013.01); *B32B 2250/242* (2013.01); *B32B 2307/31* (2013.01); *B32B 2307/51* (2013.01); *B32B 2307/5825* (2013.01); *B32B 2307/704* (2013.01); *B32B 2307/72* (2013.01); *B32B 2307/736* (2013.01); *B32B 2307/746* (2013.01); *B32B 2553/00* (2013.01); *B65B 67/08* (2013.01)

(56) References Cited

U.S. PATENT DOCUMENTS

| | | |
|---|---|---|
| 5,296,433 A | 3/1994 | Siedle et al. |
| 5,321,106 A | 6/1994 | Lapointe |
| 5,350,723 A | 9/1994 | Neithamer et al. |
| 5,425,872 A | 6/1995 | Devore et al. |
| 5,625,087 A | 4/1997 | Neithamer et al. |
| 5,721,185 A | 2/1998 | Lapointe et al. |
| 5,783,512 A | 7/1998 | Jacobsen et al. |
| 5,883,204 A | 3/1999 | Spencer et al. |
| 5,919,983 A | 7/1999 | Rosen et al. |
| 5,977,251 A | 11/1999 | Kao et al. |
| 6,103,657 A | 8/2000 | Murray |
| 6,515,155 B1 | 2/2003 | Klosin et al. |
| 6,696,379 B1 | 2/2004 | Carnahan et al. |
| 7,163,907 B1 | 1/2007 | Canich et al. |
| 9,045,628 B2 | 6/2015 | Ewart et al. |
| 10,703,869 B2 | 7/2020 | Wang et al. |
| 2005/0037219 A1 | 2/2005 | Ohlsson et al. |
| 2006/0094824 A1 | 5/2006 | Roulin et al. |
| 2011/0003129 A1 | 1/2011 | Mandare et al. |
| 2011/0015346 A1 | 1/2011 | Hermel-Davidock et al. |

FOREIGN PATENT DOCUMENTS

| | | |
|---|---|---|
| JP | 20010232732 A | 8/2001 |
| WO | 9846672 A2 | 10/1998 |
| WO | 9951433 A1 | 10/1999 |
| WO | 2012003510 A1 | 1/2012 |
| WO | 2013056466 A1 | 4/2013 |
| WO | 2014088791 A1 | 6/2014 |
| WO | 2016081065 A1 | 5/2016 |

OTHER PUBLICATIONS

Williams et al., "The Construction of a Polyethylene Calibration Curve for Gel Permeation Chromatography Using Polystyrene Fractions", J. Polym. Sci., Polym. Letters, 168, 621.

Monrabal et al., "Crystallization Elution Fractionation. A New Separation Process for Polyolefin Resins", Macromol. Symp., 2007, 71-79.

Extended European Search Report pertaining to European Patent Application No. 16382472.5, dated Apr. 13, 2017.

Chinese Search Report Action dated Nov. 23, 2020 relating to Chinese Patent Application No. 201780063317.1.

Chinese first Office Action dated Dec. 1, 2020 relating to Chinese Patent Application No. 201780063317.1.

International Search Report and Written Opinion dated Dec. 1, 2017 relating to International Patent Application No. PCT/US2017/056275.

MULTILAYER STRETCH HOOD COMPOSITIONS AND STRUCTURES

CROSS REFERENCE TO RELATED APPLICATION

This application is a National Stage Entry under 35 U.S.C. § 371 of International Patent Application No. PCT/US2017/056275 filed Oct. 12, 2017, which claims the benefit of European Patent Application Serial No. 16382472.5 filed Oct. 18, 2016, both of which are hereby incorporated by reference in their entirety.

TECHNICAL FIELD

Embodiments of the present disclosure generally relate to compositions suitable for stretch hood multilayer film structures, specifically compositions utilized in the skin layer of the stretch hood multilayer film structures.

BACKGROUND

Stretch hoods are packaging films useful in unitizing pallets of goods for shipment and transport. Stretch hoods are typically formed from gusseted film, then opened out over four "stretching arms", stretched to a greater size than the article to be covered, then placed over said article (applying also a certain stretch in the direction of application) and the arms removed. The inherent elasticity of the film makes it contract back around the article hence providing 5-sided protection and a certain load holding force where necessary.

A hood should provide even stretching, elasticity (to conform well around the wrapped article), puncture resistance (to avoid holing on the pallet corners or on sharp areas of the article), tear resistance (so that any holes that do form do not propagate into tears), seal-ability (hot tack performance to reduce the cycle time of the hooding operation), and for certain applications, holding force. Occasionally, low film haze is also required.

Typical film compositions used to make stretch hoods are based on co-extrusions that utilize a typical core layer of ethylene vinyl acetate (EVA) copolymers or less commonly, ethylene butyl acrylate (EBA) copolymers. Also used are elastomeric and plastomeric linear low density polyethylene (LLDPE). The EVA/EBA provides a good elasticity and reasonable puncture resistance and the elastomeric/plastomeric LLDPE (if used) provides improved puncture and tear resistance versus EVA or EBA solutions. In typical stretch hood film co-extrusions the core layer normally comprises 60% of the film structure and the outer skin layers the remaining 40%. The skin layer function is to impart physical properties such as puncture, tear and holding force as well as facilitate easy opening of the hood via low blocking performance. Therefore, the skin layer normally has a higher crystallinity level than the core layer. However the elasticity of the skin layer material also has to be taken into account to take advantage of the very elastic core layer. If the skin layer exhibits poor elastic properties, then irrespective of the very elastic core layer a phenomenon known as "tiger striping" can occur.

This "tiger striping" phenomenon is seen as visual stripes in the vertical direction while applying or after applying a stretch hood. The film thickness in the stripe area can be significantly lower than the rest of the film and, in fact, holes can even result. The stripes are caused by an uneven, non-uniform stretching of the film around a pallet during the application phase resulting in areas of the film stretching past their yield point. Once past the yield point, the optical properties of the film are changed due to a molecular rearrangement, which often can be observed as an improvement in clarity. These areas manifest themselves as stripes in the stretch hood application and are undesirable due to the fact the film has thinned excessively and can result in holes in the stretch hood. Therefore, there is a continual need for skin layers having a molecular make-up that is elastic enough to prevent tiger striping, while also fulfilling the other performance requirements of the skin layer, as outlined previously.

SUMMARY

Accordingly, the present embodiments are directed to multilayer films for stretch hood applications, specifically, multilayer layer films having one or more skin layers suitable for reducing tiger striping.

According to one embodiment of this disclosure, a stretch hood or stretch label multilayer film comprising a first skin layer, a second skin layer, and a core layer disposed between the first skin layer and the second skin layer is provided. The first skin layer, the second skin layer, or both independently comprise at least 50 wt. % of a linear low density polyethylene (LLDPE) resin, wherein the skin LLDPE resin exhibits each of the following properties: a Crystallization Elution Fractionation (CEF) fraction of less than 8% above an elution temperature of 94° C.; and a melt index ($I_2$) of 0.1 to 2.0 g/10 min when measured according to ASTM D 1238 at a load of 2.16 kg and temperature of 190° C. Additionally, the core layer comprises a polyethylene resin having wt % crystallinity from 10% to 40% and a single melting peak as measured by differential scanning calorimetry.

BRIEF DESCRIPTION OF THE FIGURES

The following detailed description of specific embodiments of the present disclosure may be better understood when read in conjunction with the following drawings.

DETAILED DESCRIPTION

Figure 1:
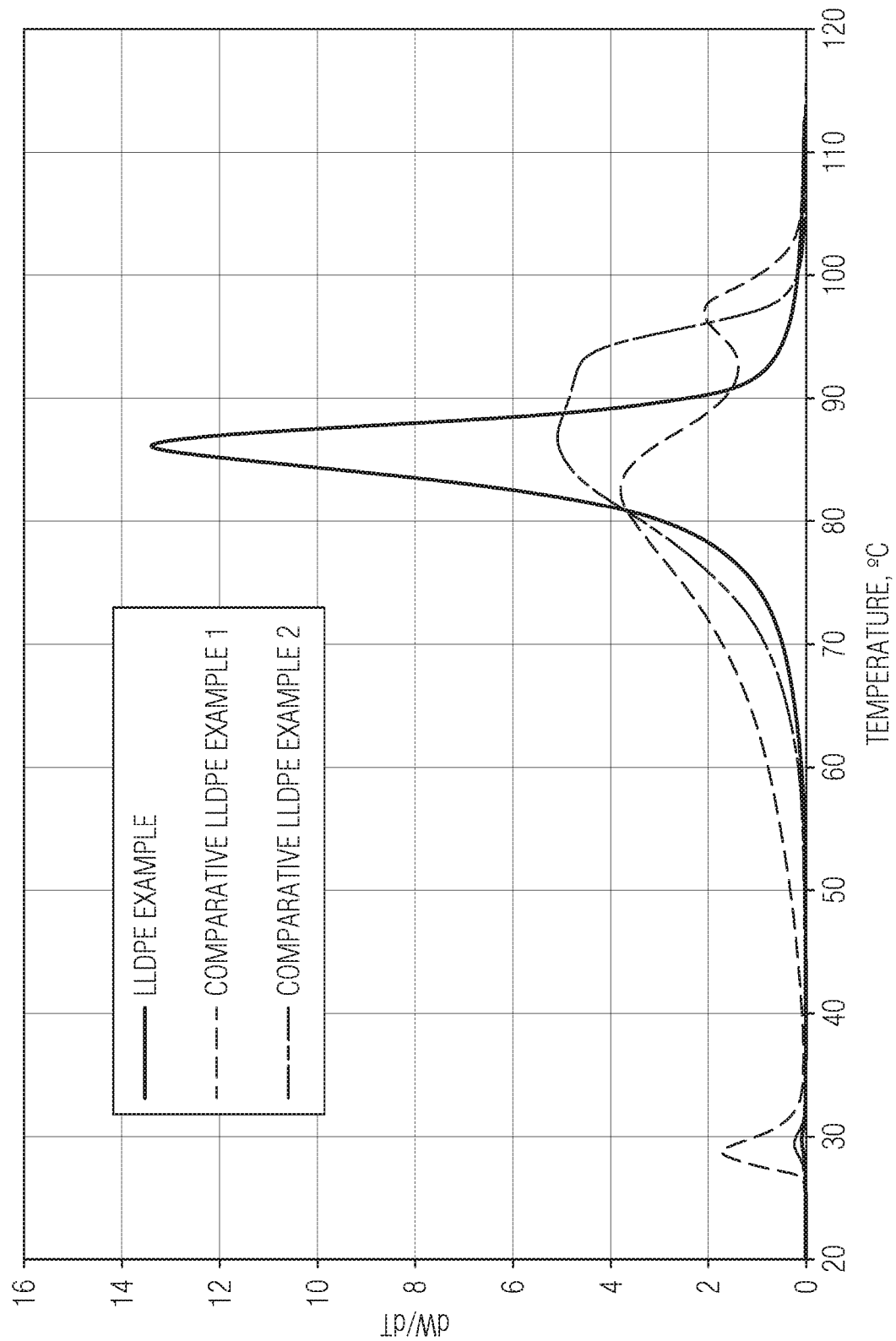
FIG. 1 is a graph illustrating the CEF results (Eluted Mass (dWT/dT) versus Temperature) for Comparative LLDPE Examples 1 and 2 and the LLDPE Example.

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

The term "polymer" refers to a polymeric compound prepared by polymerizing monomers, whether of the same or a different type. The generic term polymer thus embraces the term "homopolymer," usually employed to refer to polymers prepared from only one type of monomer, and the term "copolymer" which refers to polymers prepared from at least two monomers.

The term "polyethylene copolymer" refers to a polymer that contains more than 50 mole percent polymerized ethylene monomer (based on the total amount of polymerizable monomers) and, optionally, may contain at least one comonomer. The term "ethylene/α-olefin copolymer" refers to a polymer that contains more than 50 weight percent polymerized ethylene monomer (based on the total amount of polymerizable monomers) and at least one other α-olefin comonomer.

Embodiments of the present disclosure are directed to a stretch hood or stretch label multilayer film comprising a first skin layer, a second skin layer, and a core layer disposed between the first skin layer and the second skin layer. The skin layers i.e., the first skin layer and/or the second skin layer may each include one or multiple sublayers in the skin layer. For example, the multilayer films depicted in the Examples below include two sublayers in each of the first and second skin layers.

The first skin layer, a second skin layer, or both may comprise at least 50 wt. % of a skin linear low density polyethylene (LLDPE) resin. The skin LLDPE resin exhibits each of the following properties: a Crystallization Elution Fractionation (CEF) fraction of less than 8% above an elution temperature of 94° C., and a melt index ($I_2$) of 0.1 to 2.0 g/10 min when measured according to ASTM D 1238 at a load of 2.16 kg and temperature of 190° C.

The core layer, which may also include one or more core sublayers, comprises a polyethylene resin having wt. % crystallinity of from 10% to 40% and a single melting peak as measured by differential scanning calorimetry (DSC).

Skin Layer(s)

As stated above, the skin LLDPE resin has a CEF fraction of less than 8% above an elution temperature of 94° C. In further embodiments, the skin LLDPE resin may have a CEF fraction of less than 6% above an elution temperature of 94° C.

In another embodiment, the skin LLDPE resin may have a single melting peak as measured by DSC. In further embodiments, the skin LLDPE resin may have a single melting peak within a melting temperature range from 102° C. to 120° C., or from 102° C. to 115° C., or from 105° C. to 115° C. as measured by DSC.

The skin layer LLDPE resin includes an ethylene/α-olefin copolymer comprising: less than 100 percent, for example, at least 70 percent, or at least 80 percent, or at least 90 percent, by weight of the units derived from ethylene; and less than 30 percent, for example, less than 25 percent, or less than 20 percent, or less than 10 percent, by weight of units derived from one or more α-olefin comonomers.

The α-olefin comonomers typically have no more than 20 carbon atoms. For example, the α-olefin comonomers may have 3 to 12 carbon atoms, or from 4 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In further embodiments, the one or more α-olefin comonomers may be selected from 1-butene, 1-hexene, or 1-octene.

As stated previously, the skin LLDPE resin has a melt index, $I_2$, of 0.1 to 2.0 g/10 min when measured according to ASTM D 1238 at a load of 2.16 kg and temperature of 190° C. All individual values and subranges from 0.1 to 2.0 g/10 min are included and disclosed herein; for example, the $I_2$ may range from a lower limit of 0.1, 0.3, 0.5, 0.8, 1.0, 1.2 or 1.4 g/10 min to an upper limit of 0.9, 1.1, 1.3, 1.5, or 2.0 g/10 min. Further, the $I_2$ may be from 0.1 to 1.5 g/10 min, or in the alternative, from 0.1 to 1.0 g/10 min, from 0.2 to 1.0 g/10 min, or from 0.5 to 1.5 g/10 min, or from 0.9 to 1.5 g/10 min.

Moreover, the skin LLDPE resin may have a melt flow ratio, $I_{10}/I_2$, of 5.5 to 12, wherein melt index ($I_{10}$) is measured according to ASTM D 1238 at a load of 10 kg and a temperature of 190° C. In further embodiments, the melt flow ratio, $I_{10}/I_2$ may be from 5.5 to 10, or from 5.5 to 8, or from 6 to 8, or from 6.5 to 8.

The skin LLDPE resin may have a density in the range of 0.905 to 0.925 g/cm$^3$. All individual values and subranges from 0.905 to 0.925 g/cm$^3$ are included and disclosed herein. For example, the density can range from 0.906 to 0.922 g/cm$^3$, or from 0.910 to 0.920 g/cm$^3$.

The skin LLDPE resin may have a molecular weight distribution (MWD) in the range of from 2.0 to 3.5 as determined by gel permeation chromatography (GPC). MWD is defined as Mw/Mn with Mw being a weight average molecular weight and Mn being a number average molecular weight. All individual values and subranges from 2.0 to 3.5 are included and disclosed herein; for example, the MWD can range from a lower limit of 2, 2.1, 2.2, 2.4, 2.5, or 2.6 to an upper limit of 2.2, 2.3, 2.4, 2.5, 2.7, 2.9, 3.0, 3.2, or 3.5. Said another way, the MWD can be from 2.0 to 3.5, or in the alternative, from 2.0 to 3.0, or in the alternative, from 2.0 to 2.8, or in the alternative, from 2.0 to 2.5.

Various methodologies are contemplated for producing the skin LLDPE resin, for example, polymerization of ethylene and one or more α-olefin comonomers in the presence of one or more catalysts, such as a Ziegler-Natta catalyst, a Phillips catalyst, a metallocene catalyst, a post-metallocene catalyst, a constrained geometry complex (CGC) catalyst, biphenyl phenol (BPP) complex catalyst, or combinations of these. One method of making the LLDPE disclosed herein is described in detail in U.S. Pat. No. 5,977,251, the disclosure of which is incorporated herein by reference in its entirety.

In one embodiment, the LLDPE is prepared via a solution polymerization process in a single reactor, wherein the process comprises polymerizing ethylene and optionally one or more α-olefins in the presence of a catalyst system comprising a metal complex of a polyvalent aryloxyether corresponding to formula (I):

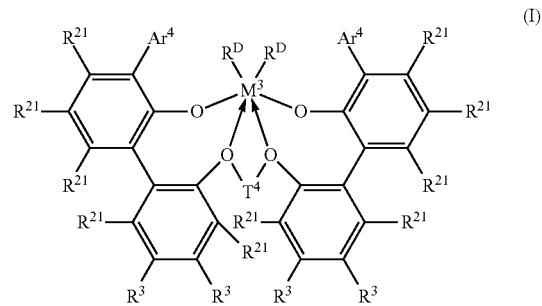

wherein $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks coplanarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

The ethylene/α-olefin copolymer composition may be produced via a solution polymerization according to the following exemplary process.

All raw materials (ethylene, 1-hexene) and the process solvent (a narrow boiling range high-purity isoparaffinic solvent commercially available under the tradename ISOPAR™ E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, approximate to 750 psig. The solvent and comonomer (1-hexene) feed is pressurized via mechanical positive displacement pump to a pressure that is above the reaction pressure, approximately 750 psig. The individual catalyst components are manually batch diluted to specified component concentrations with purified solvent (ISOPAR™ E) and pressurized to a pressure that is above the reaction pressure, approximately 750 psig. All reaction feed flows are measured with mass flow meters, independently controlled with computer automated valve control systems.

The combined solvent, monomer, comonomer and hydrogen feed to the reactor is independently temperature controlled to anywhere between 5° C. to 50° C. and typically 40° C. by passing the feed stream through a heat exchanger. The fresh comonomer feed to the polymerization reactor is injected into the reactor. The catalyst components are injected into the polymerization reactor through specially designed injection stingers with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with static mixing elements. The contents of the reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. As the stream exits the reactor, it is contacted with a deactivating agent, e.g. water, to stop the reaction. In addition, various additives such as anti-oxidants, can be added at this point. The stream then goes through another set of static mixing elements to evenly disperse the catalyst deactivating agent and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again. The separated and devolatilized polymer melt is pumped through a die specially designed for underwater pelletization, cut into uniform solid pellets, dried, and transferred into a hopper.

In another embodiment, the LLDPE is prepared via a polymerization process in a single solution phase loop reactor system, wherein the catalyst system comprises (a) one or more procatalysts comprising a metal-ligand complex of formula (II) below:

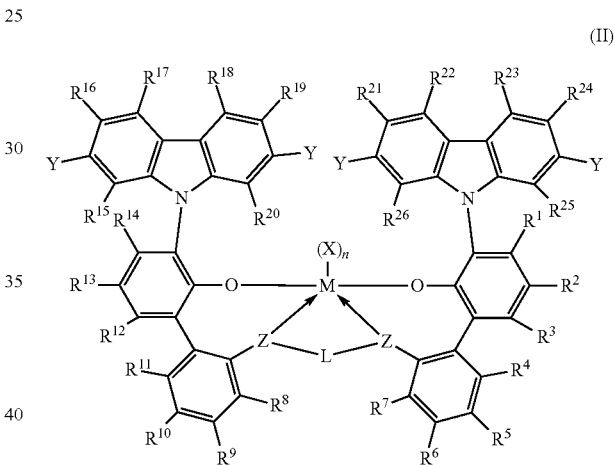

(II)

wherein:

M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (II) is, overall, neutral; and each Z independently is O, S, $N(C_1$-$C_{40})$hydrocarbyl, or $P(C_1$-$C_{40})$hydrocarbyl; and L is $(C_3$-$C_{40})$hydrocarbylene or $(C_3$-$C_{40})$heterohydrocarbylene, wherein the $(C_3$-$C_{40})$hydrocarbylene has a portion that comprises a 3-carbon atom to 10-carbon atom linker backbone linking the Z atoms in formula (I) (to which L is bonded) and the $(C_3$-$C_{40})$heterohydrocarbylene has a portion that comprises a 3-atom to 10-atom linker backbone linking the Z atoms in formula (I), wherein each of the 3 to 10 atoms of the 3-atom to 10-atom linker backbone of the $(C_3$-$C_{40})$heterohydrocarbylene independently is a carbon atom or heteroatom, wherein each heteroatom independently is O, S, S(O), S(O)2, $Si(R^C)2$, $Ge(R^C)2$, $P(R^P)$, or $N(R^N)$, wherein independently each $R^C$ is $(C_1-C_{30})$hydrocarbyl, each $R^P$ is $(C_1-C_{30})$hydrocarbyl; and each $R^N$ is $(C_1-C_{30})$ hydrocarbyl or absent; and $R^{1-26}$ are each independently selected from the group consisting of a $(C_1-C_{40})$hydrocarbyl, $(C_1-C_{40})$heterohydrocarbyl, $Si(R^C)3$, $Ge(R^C)3$, $P(R^P)2$, $N(R^N)2$, $OR^C$, $SR^C$, $NO_2$, CN, $CF_3$, $R^CS(O)$—, $R^CS(O)2$-, $(R^C)2C=N$—, $R^CC(O)O$—, $R^COC(O)$—, $R^CC(O)N(R)$—, $(R^C)2NC(O)$—, halogen atom, hydrogen atom, and any combination thereof, each of the hydrocarbyl, heterohydrocarbyl, $Si(R^C)_3$, $Ge(R^C)_3$, $P(R^P)_2$, $N(R^N)_2$, $OR^C$, $SR^C$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, hydrocarbylene, and heterohydrocarbylene groups independently is unsubstituted or substituted with one or more $R^S$ substituents, each $R^S$ independently is a halogen atom, polyfluoro substitution, perfluoro substitution, unsubstituted $(C_1-C_{18})$alkyl, $F_3C$—, $FCH_2O$—, $F_2HCO$—, $F_3CO$—, $R_3Si$—, $R_3Ge$—, $RO$—, $RS$—, $RS(O)$—, $RS(O)_2$—, $R_2P$—, $R_2N$—, $R_2C=N$—, $NC$—, $RC(O)O$—, $ROC(O)$—, $RC(O)N(R)$—, or $R_2NC(O)$—, or two of the $R^S$ are taken together to form an unsubstituted $(C_1-C_{18})$alkylene, wherein each R independently is an unsubstituted $(C_1-C_{18})$alkyl;

when $R^7$ is H, then $R^8$ is a $(C_1-C_{40})$hydrocarbyl; $(C_1-C_{40})$heterohydrocarbyl; $Si(R^C)_3$, $Ge(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)2C=N$—, $R^CC(O)O$—, $R^COC(O)$—, $R^CC(O)N(R)$—, $(R^C)_2NC(O)$— or halogen atom; or when $R^8$ is H, then $R^7$ is a $(C_1-C_{40})$hydrocarbyl; $(C_1-C_{40})$heterohydrocarbyl; $Si(R^C)_3$, $Ge(R^C)_3$, $P(R^P)_2$, $N(R^N)_2$, $OR^C$, $SR^C$, $NO_2$, CN, $CF_3$, $R^CS(O)$—, $R^CS(O)2$-, $(R^C)_2C=N$—, $R^CC(O)O$—, $R^COC(O)$—, $R^CC(O)N(R)$—, $(R^C)_2NC(O)$— or halogen atom;

optionally two or more R groups of the $R^{1-26}$ groups (for example, from $R^{1-7}$, $R^{8-14}$, $R^{8-11}$, $R^{1-3}$, $R^{4-7}$, $R^{15-20}$, $R^{21-26}$) can combine together into ring structures with such ring structures having from 3 to 50 atoms in the ring excluding any hydrogen atoms; and Y has the formula $-T(R^d)_b$ and contains more than four non-hydrogen atoms, wherein T is, independently for each Y occurrence, selected from the group consisting of C, Si, Ge, N, O, S, P or a combination thereof and wherein T is substituted with $R^d$ substituents, b being an integer from 1 to 3, depending on the valency of T and $R^d$, each $R^d$ is a substituent and is selected from the group consisting of hydrogen, $(C_1-C_{40})$hydrocarbyl; $(C_1-C_{40})$heterohydrocarbyl; $Si(R^C)_3$, $Ge(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, halogen atoms, and any combination thereof.

As used herein, the term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and poly-cyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

In one or more embodiments, a $(C_1-C_{40})$hydrocarbyl independently is an unsubstituted or substituted $(C_1-C_{40})$alkyl, $(C_3-C_{40})$cyclo alkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. More preferably, each of the aforementioned $(C_1-C_{40})$hydrocarbyl groups independently has a maximum of 20 carbon atoms (i.e., $(C_1-C_{20})$hydrocarbyl), and still more preferably a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, a radical that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted (C1-C10)alkyl, trifluoromethyl, and $(C_{45})$alkyl. The $(C_{45})$alkyl is, for example, a $(C_{27}-C_{40})$alkyl substituted by one $R^S$, which is a $(C_{18}-C_5)$alkyl, respectively. Preferably, each $(C_1-C_5)$alkyl independently is methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl; unsubstituted (C6-$C_{18}$)aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted (C6-$C_{20}$)aryl; substituted $(C_6-C_{18})$aryl; 2,4-bis $[(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_3-C_{12})$alkyl)) are defined in an analogous manner. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene are unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are a same carbon atom (e.g., —$CH_2$—) or on adjacent carbon atoms (i.e., 1,2-diradicals), or are spaced apart by one, two, or more intervening carbon atoms (e.g., respective 1,3-diradicals, 1,4-diradicals, etc.). Preferred is a 1,2-, 1,3-, 1,4-, or an alpha, omega-diradical, and more preferably a 1,2-diradical. The alpha, omega-diradical is a diradical that has maximum carbon backbone spacing between the radical carbons. More preferred is a 1,2-diradical, 1,3-diradical, or 1,4-diradical version of $(C_6-C_{18})$arylene, $(C_3-C_{20})$cycloalkylene, or $(C_2-C_{20})$alkylene.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{40})$alkylene are unsubstituted (C1-C20)alkylene, including unsubstituted 1,2-$(C_2-C_{10})$alkylene; 1,3-$(C_3-C_{10})$alkylene; 1,4-$(C_4-C_{10})$alkylene; —$CH_2$—, —$CH_2CH_2$—, —$(CH_2)_3$—,

—CH$_2$CHCH$_3$,

—(CH$_2$)$_4$—, —(CH$_2$)$_5$—, —(CH$_2$)$_6$—, —(CH$_2$)$_7$—, —(CH$_2$)$_8$—, and —(CH$_2$)$_4$C(H)(CH$_3$)—. Examples of substituted (C$_1$-C$_{40}$)alkylene are substituted (C$_1$-C$_{20}$)alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two R$^S$ may be taken together to form a (C$_1$-C$_{18}$)alkylene, examples of substituted (C$_1$-C$_{40}$) alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "(C$_3$-C$_{40}$)cycloalkylene" means a cyclic diradical (i.e., the radicals are on ring atoms) of from 3 to 40 carbon atoms that is unsubstituted or substituted by one or more R$^S$. Examples of unsubstituted (C$_3$-C$_{40}$)cycloalkylene are 1,3-cyclopropylene, 1,1-cyclopropylene, and 1,2-cyclohexylene. Examples of substituted (C$_3$-C$_{40}$)cycloalkylene are 2-oxo-1,3-cyclopropylene and 1,2-dimethyl-1,2-cyclohexylene.

The term "(C$_1$-C$_{40}$)heterohydrocarbyl" means a heterohydrocarbon radical of from 1 to 40 carbon atoms and the term "(C$_1$-C$_{40}$)heterohydrocarbylene means a heterohydrocarbon diradical of from 1 to 40 carbon atoms, and each heterohydrocarbon independently has one or more heteroatoms O; S; S(O); S(O)$_2$; Si(R$^C$)$_2$; Ge(R$^C$)$_2$; P(R$^P$); and N(R$^N$), wherein independently each R$^C$ is unsubstituted (C$_1$-C$_{18}$)hydrocarbyl, each R$^P$ is unsubstituted (C$_1$-C$_{18}$)hydrocarbyl; and each R$^N$ is unsubstituted (C$_1$-C$_{18}$)hydrocarbyl or absent (e.g., absent when N comprises —N= or tri-carbon substituted N). The heterohydrocarbon radical and each of the heterohydrocarbon diradicals independently is on a carbon atom or heteroatom thereof, although preferably is on a carbon atom when bonded to a heteroatom in formula (I) or to a heteroatom of another heterohydrocarbyl or heterohydrocarbylene. Each (C$_1$-C$_{40}$)heterohydrocarbyl and (C$_1$-C$_{40}$)heterohydrocarbylene independently is unsubstituted or substituted (by one or more R$^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

The procatalyst comprising the metal-ligand complex of formula (I) may be rendered catalytically active, in some embodiments, by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri((C$_1$-C$_{10}$) alkyl)aluminum or tri((C$_6$-C$_{18}$)aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris((C$_1$-C$_{20}$) hydrocarbyl) borate (e.g., trityl tetrafluoroborate) or a tri ((C$_1$-C$_{20}$)hydrocarbyl)ammonium tetra((C$_1$-C$_{20}$)hydrocarbyl)borane (e.g., bis(octadecyl)methylammonium tetrakis (pentafluorophenyl)borane). As used herein, the term "ammonium" means a nitrogen cation that is a ((C$_1$-C$_{20}$) hydrocarbyl)$_4$N$^+$, a ((C$_1$-C$_{20}$)hydrocarbyl)3N(H)+, a ((C$_1$-C$_{20}$)hydrocarbyl)$_2$N(H)$_2^+$, (C$_1$-C$_{20}$)hydrocarbylN(H)$_3^+$, or N(H)$_4^+$, wherein each (C$_1$-C$_{20}$)hydrocarbyl may be the same or different.

Exemplary combinations of neutral Lewis acid activating co-catalysts include mixtures comprising a combination of a tri((C$_1$-C$_4$)alkyl)aluminum and a halogenated tri((C$_6$-C$_{18}$) aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. In one or more embodiments, the ratio by moles of (metal-ligand complex):(tris (pentafluoro-phenylborane):(alumoxane) [e.g., (Group 4 metal-ligand complex):(tris(pentafluoro-phenylborane): (alumoxane)] are from 1:1:1 to 1:10:30. Other exemplary embodiments are from 1:1:1.5 to 1:5:10.

Many activating co-catalysts and activating techniques have been previously taught with respect to different metal-ligand complexes in the following U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst comprising the metal-ligand complex of formula (I) may be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-) amine, triethyl aluminum (TEA), and any combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl) borane, or an ammonium borate with an oligomeric or polymeric alumoxane compound.

The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris (pentafluorophenyl)borane alone is used as the activating co-catalyst, in some other embodiments, the number of moles of the tris(pentafluorophenyl)borane that are employed to the total number of moles of one or more metal-ligand complexes of formula (I) is from 0.5:1 to 10:1, in some other embodiments, from 1:1 to 6:1, in some other embodiments, from 1:1 to 5:1. The remaining activating co-catalysts are generally employed in approximately mole quantities equal to the total mole quantities of one or more metal-ligand complexes of formula (I).

Optionally, the skin LLDPE resin may further comprise additional components such as one or more other polymers and/or one or more additives. Such additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, antiblocks, slip agents, tackifiers, fire retardants, anti-microbial agents, odor reducer agents, anti-fungal agents, and combinations thereof. The skin LLDPE resin may contain from about 0.1 to about 10 percent by the combined weight of such additives, based on the weight of the LLDPE including such additives.

In addition to the skin LLDPE resin, the first skin layer, the second skin layer, or both may also independently include one or more of low density polyethylene (LDPE) resins, ethylene vinyl acetate (EVA), or an additional LLDPE resin in a blend with the skin LLDPE resin. The term "blend" means an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The LDPE resin, which is an ethylene/α-olefin copolymer having a greater degree of long chain branching than the skin LLDPE resin, has a density of 0.915 g/cm$^3$ to 0.925 g/cm$^3$ and a melt index, $I_2$ from 0.1 to 2.0 g/10 min. In another embodiment, the LDPE may have a density of 0.918 g/cm$^3$ to 0.922 g/cm$^3$ and an $I_2$ from 0.1 to 0.5 g/10 min when measured according to ASTM D 1238 at a load of 2.16 kg and temperature of 190° C.

Various commercial LDPE products are considered suitable, for example, DOW™ LDPE 1321 from The Dow Chemical Company, Midland, Mich. Similarly, various commercial EVA products are considered suitable, for example, Nexxstar™ Low EVA-0011 from the Exxon Mobil Corporation. Some embodiments of the additional LLDPE resin may have similar properties as the above described skin LLDPE resin; however, other LLDPE resins are also contemplated as suitable for the first skin layer, the second skin layer, or both.

As discussed above, the LLDPE skin resin may include additional optional additives. In lieu of or in addition to these LLDPE skin resin additives, the first skin layer, the second skin layer, or both may independently include additives. These additives may include but are not limited to antiblock agents, slip agents, or combinations thereof. The slip agents may include erucamide or stearyl erucamide, and are typically blended with a polymer such as LDPE in a masterbatch. Commercial slip agents may include AMPACET 10061, which is commercially available from Ampacet. The antiblock agents may include silica or talc. Many commercial products combine the slip agent and antiblock agent in a masterbatch. One such commercial masterbatch is SCHULMAN T9530 supplied by A. Schulman.

Various amounts are contemplated for each component of the first skin layer, the second skin layer, or both. In one embodiment, the first and/or second skin layer comprises 100 wt. % of the skin LLDPE resin. In further embodiments, the first and/or second skin layer comprises from 50 wt. % to 99 wt. % of the skin LLDPE resin, or from 60 wt. % to 95 wt. % of the skin LLDPE resin, or from 70 wt. % to 90 wt. % of the skin LLDPE resin, or from 80 wt. % to 90 wt. % of the skin LLDPE resin. Moreover, the LDPE, EVA, the additional LLDPE resin, or combinations thereof may be present in the first skin layer, the second skin layer, or both at levels of up to 50 wt. %, or from 1 wt. % to 40 wt. %, or from 10 wt. % to 30 wt. %, or from 10 wt. % to 25 wt. %, or from 10 wt. % to 20 wt. %. The additional additive (e.g., the slip agent or antiblock agent) may be present in the in the first skin layer, the second skin layer, or both at levels of up to 10 wt. %, or from 0.5 wt. % to 8 wt. %, or from 1 wt. % to 5 wt. %.

Core Layer

As stated above, the core layer of the multilayer film comprises a polyethylene resin having a wt. % crystallinity of from 10% to 40% and a single melting peak as measured by DSC. In further embodiments, the core polyethylene resin may have a wt. % crystallinity of 20% to 40% as measured by DSC. Moreover, the core polyethylene resin may have a single melting peak within a melting temperature range from 50 to 105° C., or from 55° C. to 102° C.

Various compositions are considered suitable for the core polyethylene resin. For example and not by way of limitation, the core polyethylene resin may include ethyl butyl acrylate (EBA) copolymers, ethyl vinyl acetate (EVA) copolymers, polyethylene homopolymers, ethylene/α-olefin copolymers, or combinations thereof. One suitable commercial EBA product is ALCUDIA® PA-1704 supplied by Repsol.

The ethylene/α-olefin copolymers may include less than 30 percent, for example, less than 25 percent, or less than 20 percent, or less than 10 percent, by weight of units derived from one or more α-olefin comonomers. The α-olefin comonomer may have 3 to 12 carbon atoms, or from 4 to 8 carbon atoms. In one or more embodiment, the core polyethylene resin is an LLDPE resin having a density from 0.870 to 0.907 g/cm³, or from 0.890 to 0.905 g/cm³. Moreover, the core polyethylene resin may have a melt index ($I_2$) of 0.1 to 2.0 g/10 min, or an $I_2$ from 0.5 to 1.0 g/10 min when measured according to ASTM D 1238 at a load of 2.16 kg and temperature of 190° C.

The core polyethylene resin may include ELITE™ AT 6101 an ethylene/α-olefin copolymer supplied by The Dow Chemical Company, Midland, Mich., or may include ethylene/α-olefin plastomers and elastomers such as AFFINITY™ PL 1880 and AFFINITY™ PF 1140 which are both supplied by The Dow Chemical Company, Midland, Mich.

In one embodiment, the core layer may include 100 wt. % of the core polyethylene resin; however, it is contemplated that additional resins may be included in the core layer, for example, other polyethylene resins or polyolefin resins (e.g., polypropylene resins). Consequently, in further embodiments, the core layer may include 50 to 99 wt. % of the core polyethylene resin, or from 60 to 95 wt. % of the core polyethylene resin, or from or from 70 to 90 wt. % of the core polyethylene resin. In addition to additional resins, it is also contemplated that additional additives as described above may also be included in the core layer.

Multilayer Film

The multilayer film may include thicknesses ranging from 30 to 150 μm, or from 50 to 150 μm, or from 80 to 120 μm. When the multilayer film is a stretch hood structure, the thickness may be from 60 microns to 150 μm. Alternatively, when the multilayer film is a stretch label, the thickness of the multilayer film may be from 30 to 100 microns. In one or more embodiments, the first skin layer and second skin layer have a combined thickness of 10 to 50% of the overall thickness of the multilayer film, or from 20 to 50% of the overall thickness of the multilayer film.

Without being bound by theory, the present multilayer film stretch hoods are effective at reducing tiger striping as indicated by the following permanent deformation properties. Specifically, the multilayer film exhibits a permanent deformation of less than 45% as measured by a stretch hooder 60/40 test and also exhibits a permanent deformation less than 50% as measured by a stretch hooder 100/75 test, when the multilayer film has an overall thickness of 100 μm with the first skin layer and the second skin layer each having a thickness of 20 μm. These permanent deformation properties demonstrate that these stretch multilayer films achieve improved elastic performance which reduces tiger striping in stretch hood multilayer films.

EXAMPLES

The following multilayer film examples illustrate features of the present disclosure but are not intended to limit the scope of the disclosure.

Film Polymers and Additives

Figure 2:
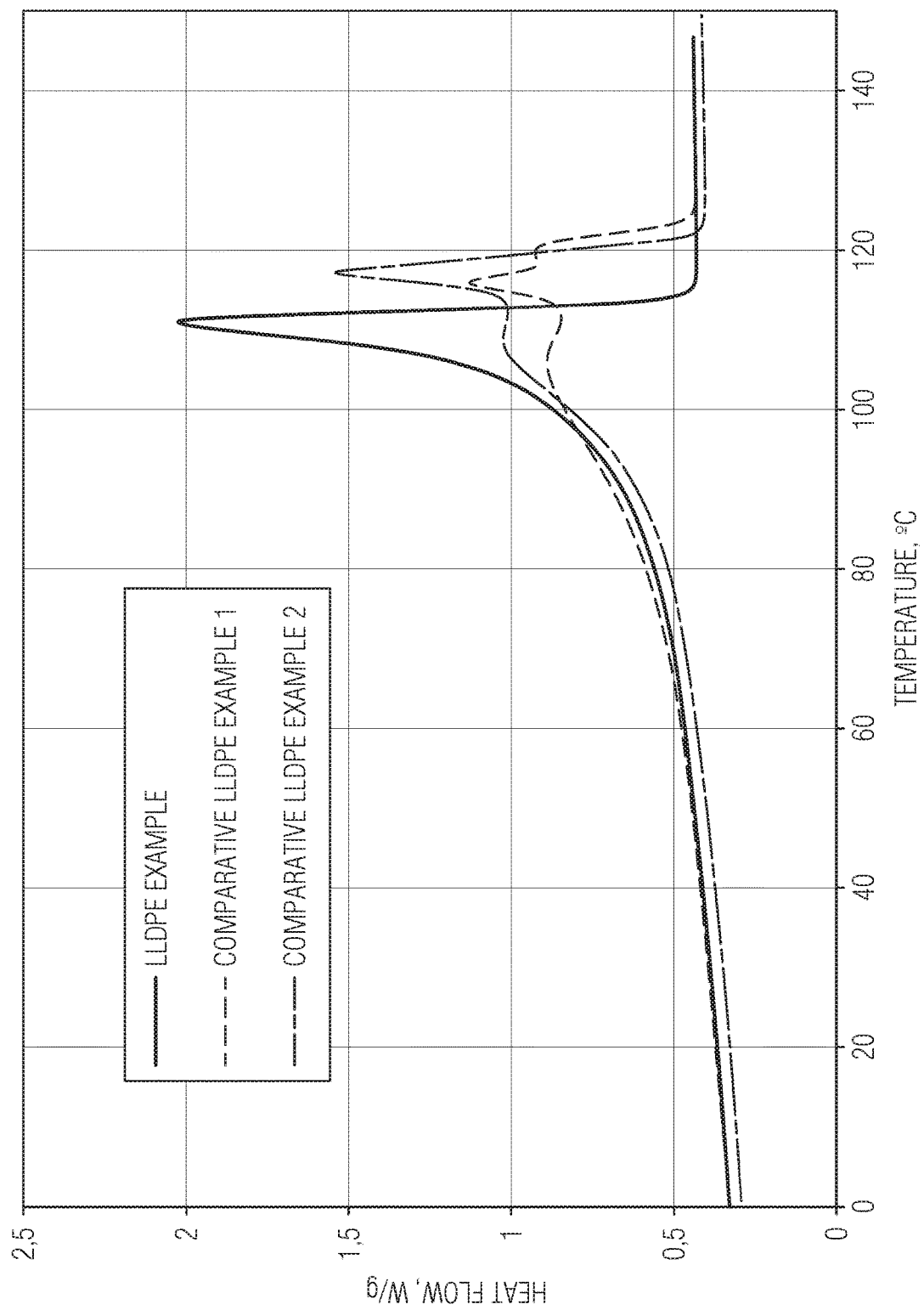
FIG. 2 is a Differential Scanning calorimetry (DSC) curve illustrating the relationship between Heat flow (W/g) versus temperature (° C.) for Comparative LLDPE Examples 1 and 2 and the LLDPE Example.

Comparative LLDPE 1, which is in the skin layer of Comparative Film Example 1 listed in Table 4, is DOWLEX™ 4056G, a linear low density polyethylene having a melt index ($I_2$) of 1.3 g/10 min when measured according to ASTM D 1238 at a load of 2.16 kg and temperature of 190° C., a density of 0.916 g/cm³, a first DSC melting peak, $T_{m1}$, of 106° C. and a second DSC melting peak, $T_{m2}$, of 116° C., a CEF fraction above 94° C. of 12.9%, and an $I_{10}/I_2$ of 7.4. DOWLEX™ 4056G is commercially available from The Dow Chemical Company (Midland, Mich.). Additional properties, such as the molecular weight properties of Comparative LLDPE 1, are provided below in Table 3. Moreover, the CEF curve of Comparative LLDPE 1 is depicted in FIG. 1, and the DSC curve of Comparative LLDPE 1 is depicted in FIG. 2.

Comparative LLDPE 2, which is in the skin layer of Comparative Film Example 2 listed in Table 4, is EXCEED™ 1018, a linear low density polyethylene (ethylene-hexene copolymer) prepared via a gas phase polymerization process in the presence of a metallocene catalyst system. EXCEED™ 1018, which is commercially available from ExxonMobil Chemical Company (Houston, Tex.), has a melt index ($I_2$) of approximately 1.0 g/10 minutes when measured according to ASTM D 1238 at a load of 2.16 kg and temperature of 190° C., a density of approximately 0.918 g/cm³, a first DSC melting peak, $T_{m1}$, of 109° C. and a second DSC melting peak, $T_{m2}$, of 118° C., a CEF fraction above 94° C. of 11.2%, and an $I_{10}/I_2$ of about 6.0. Additional properties, such as the molecular weight properties of Comparative LLDPE 2, are provided below in Table 3. Moreover, the CEF curve of Comparative LLDPE 2 is depicted in FIG. 1, and the DSC curve of Comparative LLDPE 2 is depicted in FIG. 2.

ELITE AT™ 6101, which is in the core layer of the film examples listed in Table 4, is a polyethylene resin having a melt index ($I_2$) of 0.80 g/10 min when measured according to ASTM D 1238 at a load of 2.16 kg and temperature of 190° C., a density of 0.905 g/cm³, a single DSC melting peak, $T_m$, of 101.3° C., and a wt. % crystallinity of 38.9%. ELITE™ AT 6101 is commercially available from The Dow Chemical Company (Midland, Mich.).

Schulman T9530, available from A. Schulman, Inc, is an anti-block/slip masterbatch comprising 5% by weight of a slip agent (stearyl erucamide) and 10% by weight of an antiblock agent (natural silica). Schulman T9530 is in the skin layers of the film examples listed in Table 4.

DOW™ LDPE 1321, which is in the skin layer of the film examples listed in Table 4, is a low density polyethylene resin having a melt index ($I_2$) of 0.25 g/10 min when measured according to ASTM D 1238 at a load of 2.16 kg and temperature of 190° C., and a density of 0.921 g/cm³. DOW™ LDPE 1321 is commercially available from The Dow Chemical Company (Midland, Mich.).

The LLDPE Example, which is an example embodiment of the skin LLDPE resin detailed above and is included in the Film Examples detailed below, is an ethylene-hexene copolymer prepared via solution polymerization process in a single reactor in the presence of a catalyst system comprising a metal complex of a polyvalent aryloxyether, the LLDPE example having a melt index ($I_2$) of 1.05 g/10 minutes when measured according to ASTM D 1238 at a load of 2.16 kg and temperature of 190° C., a density of 0.916 g/cm³, a single DSC melting peak, $T_m$, of 111° C., a CEF fraction above 94° C. of 3.0%, and an $I_{10}/I_2$ of 7.3. The LLDPE Example is prepared via solution polymerization in a single loop reactor system as described in U.S. Pat. No. 5,977,251 in the presence of a Zirconium based catalyst system ("Post-Metallocene Catalyst") comprising [2,2'''-[1, 3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)-Zirconium, represented by the following formula:

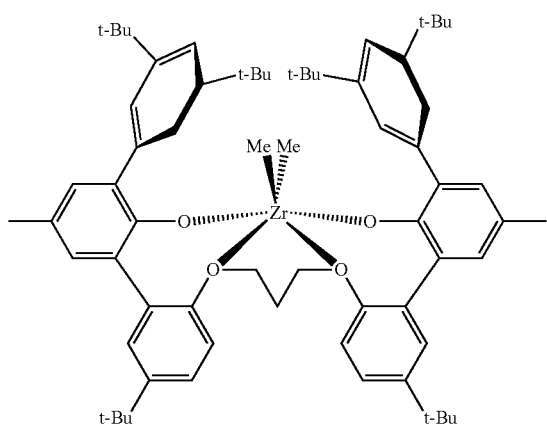

The polymerization conditions for the LLDPE Example are reported in Tables 1 and 2 as follows. Referring to Tables 1 and 2, TEA is triethylaluminum and PETROSOL D 100/120 is solvent which is commercially available from CEPSA (Compañía Española de Petroleos, S.A.U., Madrid, Spain). Molecular weight properties were measured and are reported in Table 3.

TABLE 1

| 1. REACTOR FEEDS | Units | LLDPE Example |
|---|---|---|
| Reactor Solvent/Ethylene Feed Flow ratio | g/g | 4.04 |
| Solvent Type Used | | PETROSOL D 100/120 |
| Comonomer Type Used | | 1-Hexene |
| Reactor Comonomer/Ethylene Feed Flow ratio | g/g | 0.263 |
| Reactor Fresh Hydrogen/ethylene Feed Flow ratio | g/kg | 0.058 |
| Reactor Control Temperature | °C. | 160 |
| Reactor Pressure (gauge) | Bar | 52 |
| Reactor Ethylene Conversion | % | 86.9 |
| Reactor Residence Time | min | 6.5 |
| Recycle Ratio | | 4.2 |

TABLE 2

| 2. CATALYST | LLDPE Example |
|---|---|
| Reactor Co-Catalyst-1/Catalyst Molar feed Ratio | 2.0 |
| Reactor Co-Catalyst-1 Type | bis(hydrogenated tallow alkyl)methyl, tetrakis(pentafluorophenyl)borate(1-) amine |
| Reactor Co-Catalyst-2/Catalyst Molar Ratio | 42 |
| Reactor Co-Catalyst-2 Type | (TEA) |

TABLE 3

| | GPC | | | | CEF % Area > |
|---|---|---|---|---|---|
| | Mn | Mw | Mz | Mw/Mn | 94° C. |
| LLDPE Example | 42,237 | 95,120 | 183,116 | 2.25 | 3.0 |
| Comparative LLDPE 1 | 24,368 | 106,778 | 393,971 | 4.38 | 12.9 |
| Comparative LLDPE 2 | 45,645 | 109,931 | 197,426 | 2.41 | 11.2 |

These CEF properties listed in Table 3 are also shown in FIG. 1. Additionally, the DSC curve of the LLDPE Example is provided in FIG. 2.

Film Fabrication

Referring to Table 4 below, an Alpine seven layer blown film line was used to produce three layer co-extruded films comprising 2 skin layers (layers 1-2 and 6-7, respectively) each comprising a single layer where layers 1, 2, 6, and 7 have a thickness of approximately 10 percent each based on the total thickness of the three layer co-extruded film, and one core layer derived from three single layers (layers 3-5) having a total thickness of approximately 60 percent based on the total thickness of the three layer co-extruded film. The blown film line consists of seven groove fed extruders with single flight screws (all 50 mm). The length/diameter (L/D) ratio for all screws is 30:1. The blown film line has a 250 mm die with dual lip air ring cooling system, with a screen pack configuration of 20:40:60:80:20 mesh and is equipped with internal bubble cooling system. Extruders 1, 2, 6 and 7 feed into skin layers on either side of the co-extruded film and extruders 3, 4, and 5 feed into the core layer of the 3-layer film. All films are produced at an overall thickness of 100 μm, with each skin layer having a thickness of 20 μm. As shown, Comparative Film Examples 1 and 2 include Comparative LLDPE resins 1 and 2, respectively, in the skin layers, whereas the Film Example includes the LLDPE Example resin in the skin layers.

TABLE 4

| | Extruder | | | | |
|---|---|---|---|---|---|
| | 1 (10μ) Skin Layer | 2 (10μ) Skin Layer | 3, 4, 5 (60μ) Core | 6 (10μ) Skin Layer | 7 (10μ) Skin Layer |
| Comparative Film Example 1 | 82 wt. % Comparative LLDPE 1 + 15 wt. % DOW ™ LDPE 132I + 3 wt. % Schulman T9530 | 82 wt. % Comparative LLDPE 1 + 15 wt. % DOW ™ LDPE 132I + 3 wt. % Schulman T9530 | 100 wt. % ELITE AT ™ 6101 | 82 wt. % Comparative LLDPE 1 + 15 wt. % DOW ™ LDPE 132I + 3 wt. % Schulman T9530 | 82 wt. % Comparative LLDPE 1 + 15 wt. % DOW ™ LDPE 132I + 3 wt. % Schulman T9530 |

TABLE 4-continued

| | Extruder | | | | |
|---|---|---|---|---|---|
| | 1 (10μ) Skin Layer | 2 (10μ) | 3, 4, 5 (60μ) Core | 6 (10μ) Skin Layer | 7 (10μ) |
| Comparative Film Example 2 | 82 wt. % Comparative LLDPE 2 + 15 wt. % DOW ™ LDPE 132I + 3 wt. % Schulman T9530 | 82 wt. % Comparative LLDPE 2 + 15 wt. % DOW ™ LDPE 132I + 3 wt. % Schulman T9530 | 100 wt. % ELITE AT ™ 6101 | 82 wt. % Comparative LLDPE 2 + 15 wt. % DOW ™ LDPE 132I + 3 wt. % Schulman T9530 | 82 wt. % Comparative LLDPE 2 + 15 wt. % DOW ™ LDPE 132I + 3 wt. % Schulman T9530 |
| Film example | 82 wt. % LLDPE Example + 15 wt. % DOW ™ LDPE 132I + 3 wt. % Schulman T9530 | 82 wt. % LLDPE Example + 15 wt. % DOW ™ LDPE 132I + 3 wt. % Schulman T9530 | 100 wt. % ELITE AT ™ 6101 | 82 wt. % LLDPE Example + 15 wt. % DOW ™ LDPE 132I + 3 wt. % Schulman T9530 | 82 wt. % LLDPE Example + 15 wt. % DOW ™ LDPE 132I + 3 wt. % Schulman T9530 |

Film Fabrication Conditions—Film Example

For the Film Example of Table 4, extruders 1, 2, 6, and 7 contained 82 wt % of LLDPE Example 1, 3 wt % of Schulman T9530 antiblock/slip masterbatch and 15 wt. % of DOW™ LDPE 1321. Extruders 3 through 5 contained 100 wt % of ELITE AT 6101. The fabrication conditions are reported in Tables 5, 6a, and 6b.

TABLE 5

| Film Example | Screw speed (RPM) | % of full load current | Melt temperature (° F.) | Melt pressure (psi) | Layer % | Output (lb/hr) |
|---|---|---|---|---|---|---|
| Extruder 1 | 25.3 | 54.9 | 471 | 5589 | 10 | 38 |
| Extruder 2 | 31.1 | 52.7 | 475 | 5953 | 10 | 37 |
| Extruder 3 | 47.8 | 58.8 | 492 | 8537 | 16 | 60 |
| Extruder 4 | 75.3 | 64.1 | 493 | 8366 | 26 | 98 |
| Extruder 5 | 51.1 | 60 | 474 | 8302 | 18 | 68 |
| Extruder 6 | 30.4 | 53.5 | 476 | 6283 | 10 | 38 |
| Extruder 7 | 24.6 | 54.9 | 448 | 5592 | 10 | 38 |

All temperatures were measured at one point during the process, and maintained at approximately the measured value ±2° F.

TABLE 6a

| Actual Temperature profile (° F.) | Extruder 1 | Extruder 2 | Extruder 3 | Extruder 4 | Extruder 5 | Extruder 6 | Extruder 7 |
|---|---|---|---|---|---|---|---|
| Zone 1 | 92.9 | 94.1 | 179.4 | 115.4 | 153.9 | 101 | 70.4 |
| Zone 2 | 379.5 | 380.2 | 380.2 | 379.4 | 379.8 | 380.2 | 379.7 |
| Zone 3 | 380.1 | 379.5 | 380.4 | 380 | 379.8 | 379.4 | 379.3 |
| Zone 4 | 381.1 | 378.6 | 381 | 380.1 | 378.5 | 377 | 380.4 |
| Zone 5 | 382.1 | 378.3 | 382.6 | 379.8 | 378.9 | 379.2 | 381.2 |
| Adapter 1 | 450.2 | 450.4 | 452 | 449.8 | 448.1 | 449.9 | 450.2 |
| Adapter 2 | 449.7 | 448.7 | 451.5 | 450.9 | 450.2 | 450.5 | 447.3 |
| Adapter 3 | 449.7 | 449.5 | 450.4 | 449.7 | 450 | 450 | 450.1 |

All temperatures were measured at one point during the process, and maintained at approximately the measured value ±2° F.

TABLE 6b

| Die temperature 1 (° F.) | 450.4 | Blow up ratio | 4 | Die gap (mm) | 2 |
|---|---|---|---|---|---|
| Die temperature 2 (° F.) | 447.9 | Lay flat (inches) | 62.4 | Nip speed (ft/min) | 32.1 |
| Die temperature 3 (° F.) | 449.2 | left gusset (inches) | 12 | Die diameter (mm) | 250 |
| Die temperature 4 (° F.) | 448.9 | right gusset (inches) | 12 | | |
| Die temperature 5 (° F.) | 449 | Thickness (mils) | 4 | | |

All temperatures were measured at one point during the process, and maintained at approximately the measured value ±2° F.

Film Fabrication Conditions—Comparative Film Example 1

Extruders 1, 2, 6, and 7 contained 82 wt % of Comparative LLDPE 1, 3 wt % of Schulman T9530 antiblock/slip masterbatch and 15 wt. % of DOW™ LDPE 1321. Extruders 3 through 5 contained 100 wt % of ELITE AT 6101. The fabrication conditions are reported in Tables 7, 8a, and 8b.

TABLE 7

| Comparative Film Example 1 | Screw speed (RPM) | % of full load current | Melt temperature (° F.) | Melt pressure (psi) | Layer % | Output (lb/hr) |
|---|---|---|---|---|---|---|
| Extruder 1 | 25.6 | 53.1 | 466.6 | 5177 | 10 | 39.7 |
| Extruder 2 | 26.3 | 52 | 468.9 | 5345 | 10 | 40.4 |
| Extruder 3 | 66.7 | 63.3 | 498.5 | 9326 | 20 | 79.8 |
| Extruder 4 | 66 | 60.5 | 483.5 | 7442 | 20 | 79.8 |
| Extruder 5 | 63.4 | 62.1 | 482.6 | 8749 | 20 | 79.8 |
| Extruder 6 | 27.4 | 51 | 469.4 | 5213 | 10 | 39.7 |
| Extruder 7 | 25.9 | 52.3 | 446.4 | 4721 | 10 | 40.2 |

All temperatures were measured at one point during the process, and maintained at approximately the measured value ±2° F.

TABLE 8a

| Actual Temperature profile (° F.) | Extruder 1 | Extruder 2 | Extruder 3 | Extruder 4 | Extruder 5 | Extruder 6 | Extruder 7 |
|---|---|---|---|---|---|---|---|
| Zone 1 | 91.4 | 90.5 | 105 | 104.2 | 101.8 | 99.8 | 70.9 |
| Zone 2 | 380 | 379.9 | 380 | 380.2 | 380 | 379.6 | 380 |
| Zone 3 | 379.9 | 371.7 | 380.1 | 380.1 | 379.9 | 379.9 | 379.9 |
| Zone 4 | 380.1 | 379.8 | 382.1 | 380.1 | 376.9 | 379.4 | 380.1 |
| Zone 5 | 379.9 | 380 | 379.6 | 380.1 | 380.3 | 379.8 | 380.2 |
| Adapter 1 | 450 | 449.9 | 448.4 | 450 | 449.8 | 449.9 | 450.1 |

TABLE 8a-continued

| Actual Temperature profile (° F.) | Extruder 1 | Extruder 2 | Extruder 3 | Extruder 4 | Extruder 5 | Extruder 6 | Extruder 7 |
|---|---|---|---|---|---|---|---|
| Adapter 2 | 450 | 450.6 | 453.9 | 449.2 | 450.1 | 449.9 | 449.8 |
| Adapter 3 | 450 | 450.5 | 450.5 | 450.4 | 449.7 | 449.6 | 450.1 |

All temperatures were measured at one point during the process, and maintained at approximately the measured value ±2° F.

TABLE 8b

| | | | |
|---|---|---|---|
| Die temperature 1 (° F.) | 447.4 | Blow up ratio | 4 |
| Die temperature 2 (° F.) | 448.4 | Lay flat (inches) | 62.31 |
| Die temperature 3 (° F.) | 448.3 | left gusset (inches) | 12 |
| Die temperature 4 (° F.) | 449.3 | right gusset (inches) | 12 |
| Die temperature 5 (° F.) | 448.8 | Thickness (mils) | 4 |
| Die gap (mm) | 2 | Nip speed (ft/min) | 33.5 |
| Die diameter (mm) | 250 | | |

All temperatures were measured at one point during the process, and maintained at approximately the measured value ±2° F.

Film Fabrication Conditions—Comparative Film Example 2

Extruders 1, 2, 6, and 7 contained 82 wt % of a 1.0 melt index, 0.918 g/cm3 density metallocene polyethylene (Exceed 1018), 3 wt % of antiblock and slip masterbatch and 15 wt. % of DOW™ LDPE 1321. Extruders 3 through 5 contained 100 wt % of ELITE AT 6101. The fabrication conditions are reported in Tables 9, 10a, and 10b.

TABLE 9

| Comparative Film Example 2 | Screw speed (RPM) | % of full load current | Melt temperature (° F.) | Melt pressure (psi) | Layer % | Output (lb/hr) |
|---|---|---|---|---|---|---|
| Extruder 1 | 22 | 57.8 | 473.9 | 6322 | 10 | 37.9 |
| Extruder 2 | 23.9 | 56.3 | 474.2 | 6646 | 10 | 37.2 |
| Extruder 3 | 65.8 | 62.7 | 504 | 9543 | 20 | 75.3 |
| Extruder 4 | 62.8 | 60.2 | 481.5 | 7432 | 20 | 74.9 |
| Extruder 5 | 64.2 | 62.7 | 467.2 | 8967 | 20 | 75.2 |
| Extruder 6 | 23.7 | 55.5 | 476.6 | 6566 | 10 | 37.7 |
| Extruder 7 | 22.2 | 57.6 | 454.1 | 6013 | 10 | 37.3 |

All temperatures were measured at one point during the process, and maintained at approximately the measured value ±2° F.

TABLE 10a

| Actual Temp profile (° F.) | Extruder 1 | Extruder 2 | Extruder 3 | Extruder 4 | Extruder 5 | Extruder 6 | Extruder 7 |
|---|---|---|---|---|---|---|---|
| Zone 1 | 94.2 | 90.1 | 100.8 | 101.9 | 97.6 | 99.9 | 70.9 |
| Zone 2 | 380.2 | 379.8 | 380.1 | 379.8 | 380.2 | 379.2 | 379.4 |
| Zone 3 | 379.6 | 379.6 | 380.2 | 379.7 | 380.8 | 379.3 | 379.9 |
| Zone 4 | 379.8 | 380.9 | 381.1 | 379.4 | 381.1 | 376.3 | 379.9 |
| Zone 5 | 380.6 | 380.1 | 379.6 | 380.1 | 379.8 | 381.6 | 381.4 |

TABLE 10a-continued

| Actual Temp profile (° F.) | Extruder 1 | Extruder 2 | Extruder 3 | Extruder 4 | Extruder 5 | Extruder 6 | Extruder 7 |
|---|---|---|---|---|---|---|---|
| Adapter 1 | 450 | 449.9 | 449.2 | 448.2 | 450.8 | 450.1 | 449.9 |
| Adapter 2 | 449.9 | 447.1 | 447.1 | 446.3 | 447.7 | 451.4 | 451.7 |
| Adapter 3 | 450.2 | 448.4 | 448.4 | 450.3 | 450.4 | 451 | 450.1 |

All temperatures were measured at one point during the process, and maintained at approximately the measured value ±2° F.

TABLE 10b

| | | | |
|---|---|---|---|
| Die temperature 1 (° F.) | 449.4 | Blow up ratio | 2.56 |
| Die temperature 2 (° F.) | 449.4 | Frost line height (inches) | 35 |
| Die temperature 3 (° F.) | 448.7 | Lay flat (inches) | 39.58 |
| Die temperature 4 (° F.) | 449.6 | left gusset (inches) | 7.5 |
| Die temperature 5 (° F.) | 449.4 | right gusset (inches) | 7.5 |
| | | net layflat (inches) | 24.58 |
| Die gap (mm) | 2 | Nip speed (ft/min) | 49.2 |
| Die diameter (mm) | 250 | Thickness (mils) | 4 |

All temperatures were measured at one point during the process, and maintained at approximately the measured value ±2° F.

Film Testing Data

The Film Example and Comparative Film Examples 1 and 2 were tested for their various properties according to the test methods described below and these properties are reported in Table 11 below.

TABLE 11

| Metric | Units | Comparative Film Example 1 | Comparative Film Example 2 | Film Example |
|---|---|---|---|---|
| Puncture, Avg-Peak Load | Lbf | 29.3 | 30.7 | 29.8 |
| Avg-Permanent Deformation (100/75) | % | 55.0 | 51.3 | 47.6 |
| Avg-Load at 75% after 5 min | Lbf | 2.4 | 2.4 | 2.6 |
| Avg-Permanent Deformation (60/40) | % | 48.2 | 47.8 | 41.7 |
| Avg-Load at 40% after 5 min | Lbf | 2.3 | 2.3 | 2.3 |
| Avg-Strain At Yield (CD) | % | 12.0 | 12.2 | 9.5 |
| Avg-Stress At Yield (CD) | Psi | 1181.6 | 1198.9 | 997.4 |

Figure 3:
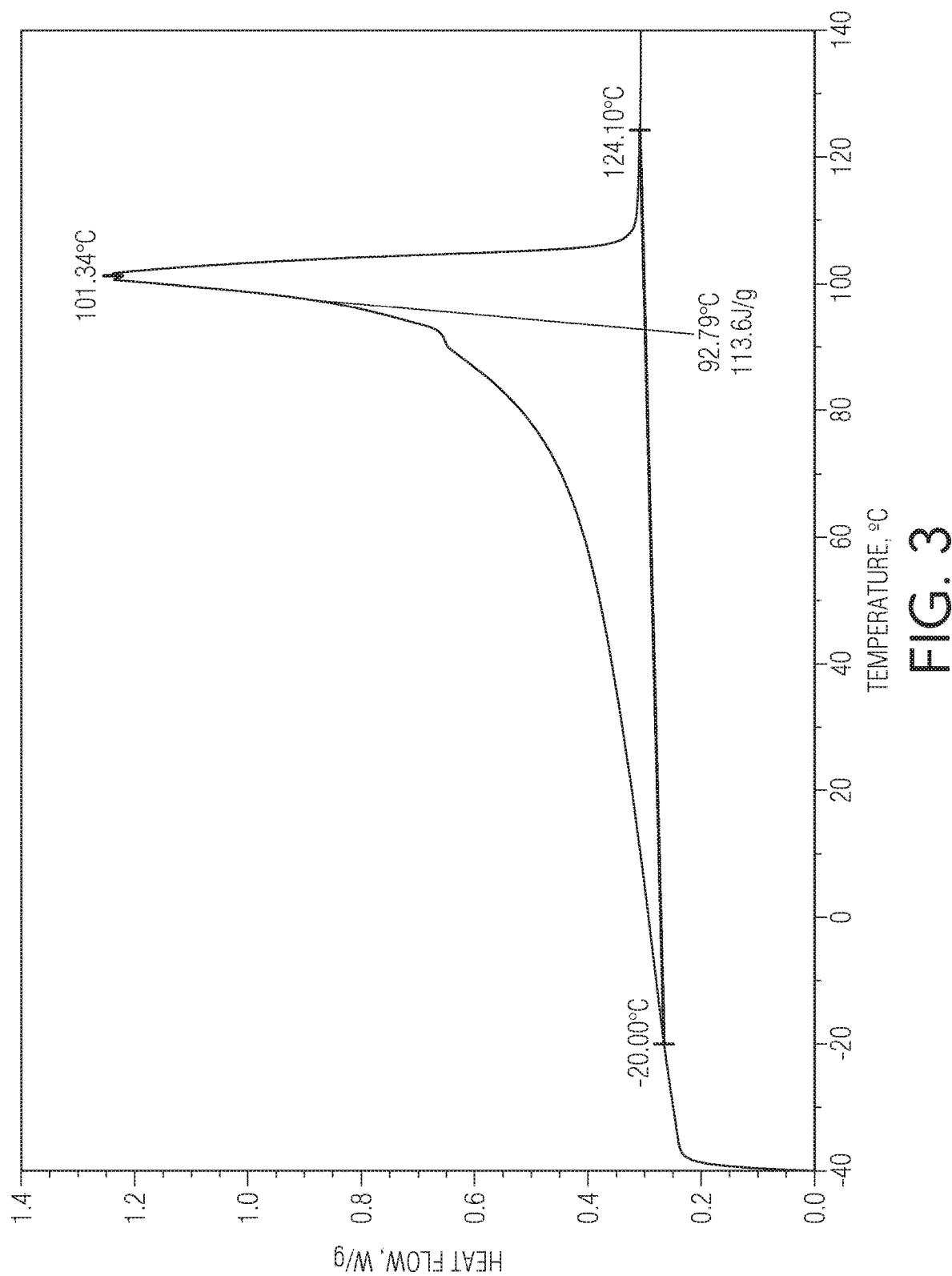
FIG. 3 is a Differential Scanning calorimetry (DSC) curve illustrating the relationship between Heat flow (W/g) versus temperature (° C.) for the core polyethylene resin.
Figure 4:
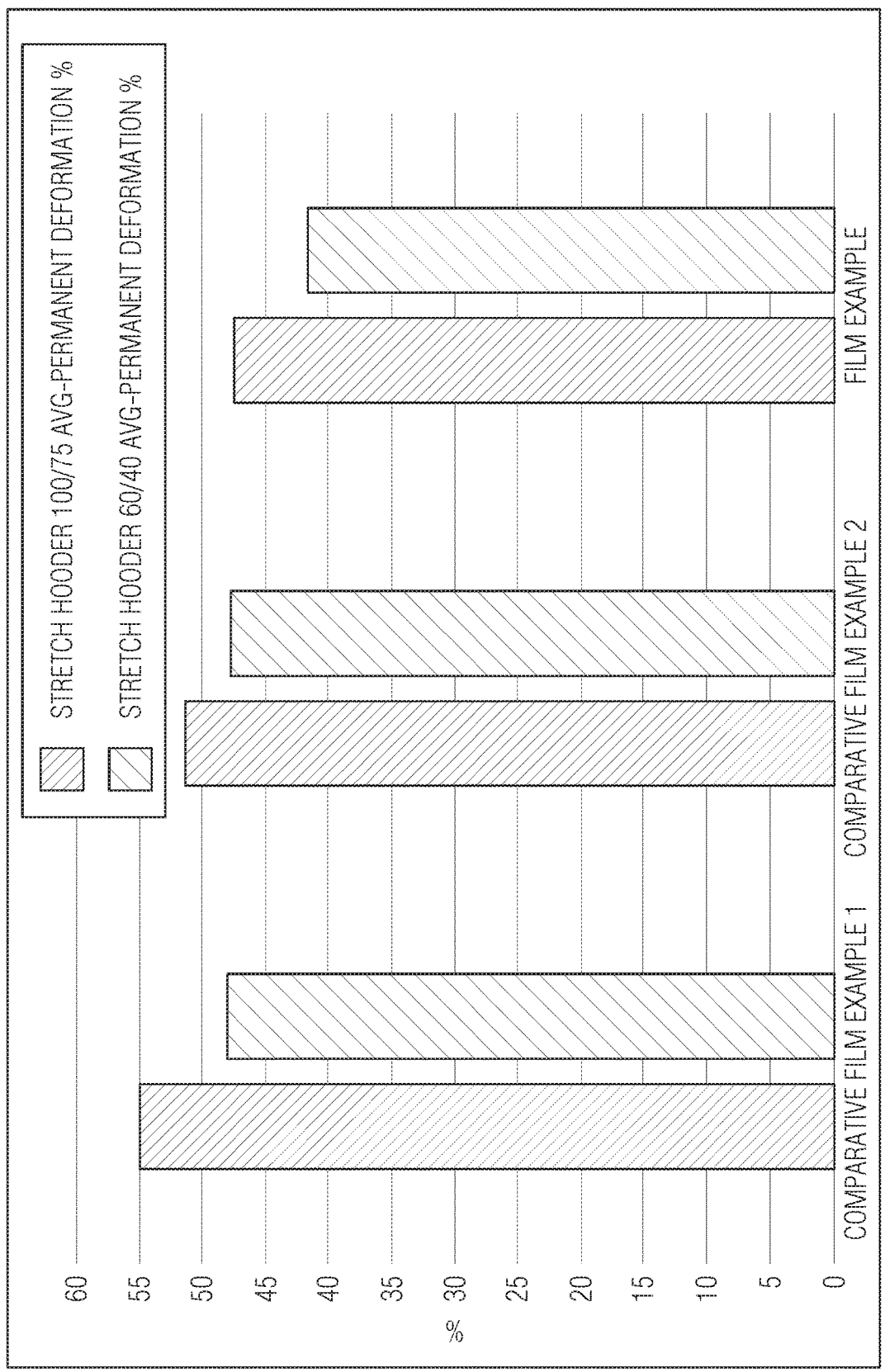
FIG. 4 is a bar graph illustrating permanent deformation when undergoing the stretch hooder 60/40 and 100/75 tests for Comparative Film Examples 1 and 2 and the Film Example.

Referring to FIG. 3 and Table 11, the Film Example exhibited a permanent deformation of less than 45%, specifically, 41.7% as measured by a stretch hooder 60/40 test. In contrast, Comparative Film Examples 1 and 2, which included Comparative LLDPE 1 and 2, respectively, both exhibited a permanent deformation well above 45%. Similarly, the Film Example exhibited a permanent deformation of less than 50%, specifically, 47.6% as measured by a stretch hooder 100/75 test. In contrast, Comparative Film Examples 1 and 2, which included Comparative LLDPE 1 and 2, respectively, both exhibited a permanent deformation well above 50%.

Test Methods

The test methods include the following:

Melt Indices

Melt indices ($I_2$ and $I_{10}$) were measured in accordance to ASTM D-1238 at 190° C. and at 2.16 kg and 10 kg load, respectively. Their values are reported in g/10 min, which corresponds to grams eluted per 10 minutes.

Density

Samples for density measurement were prepared according to ASTM D4703 and reported in grams/cubic centimeter (g/cc or g/cm³). Measurements were made within one hour of sample pressing using ASTM D792, Method B.

Gel Permeation Chromatography (GPC)

The chromatographic system consisted of a PolymerChar GPC-IR (Valencia, Spain) high temperature GPC chromatograph equipped with a 4-capillary differential viscometer detector and a IR5 multi-fixed wavelength infra-red detector. A Precision Detectors (subsidiary of Agilent, Calif.) 2-angle laser light scattering detector Model 2040 was added to the system. The 15-degree angle of the light scattering detector was used for calculation purposes. Data collection was performed using GPCOne software from PolymerChar. The system was equipped with an on-line solvent degas device from Agilent.

Both the carousel compartment and the column compartment were operated at 150° C. The columns used were 4 Agilent Technologies Mixed A 30 cm 20-micron columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

The IR5 detector "measurement" sensor was used for all GPC calculations. For conventional molecular weight measurements, the GPC column set was calibrated with 21 narrow molecular weight distribution polystyrene standards with molecular weights ranging from 580 to 8,400,000 and were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The narrow standards mixtures were run first and in order of decreasing highest molecular weight component to minimize degradation. The polystyrene standard peak molecular weights were converted to polyethylene molecular weights using the following equation (as described in Williams and Ward, J. Polym. Sci., Polym. Let., 6, 621 (1968)).:

$$M_{polyethylene} = A \times (M_{polystyrene})^B$$

where M is the molecular weight, A has a value of approximately 0.41 for conventional GPC and triple detector backbone MW calculations (referencing an A value that yields 52,000 Mw for NBS 1475) and B is equal to 1.0. A fifth order polynomial was used to fit the respective polyethylene-equivalent calibration points. GPC Calculations were done using PolymerChar GPC One software.

Crystallization Elution Fractionation (CEF) Method

The Crystallization Elution Fractionation (CEF) method is conducted according to the method described in Monrabal et al, Macromol. Symp. 257, 71-79 (2007), which is incorporated herein by reference. The CEF instrument is equipped with an IR-4 or IR-5 detector (such as that sold commercially from PolymerChar, Spain) and a two angle light scattering detector Model 2040 (such as those sold commercially from Precision Detectors). A 10 micron guard column of 50 mm×4.6 mm (such as that sold commercially from PolymerLabs) is installed before the IR-4 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2-0.5 mm) (such as commercially available from EMD Chemicals) is also obtained. The silica gel is dried in a vacuum oven at 160° C. for about two hours before use. ODCB dried by silica gel is hereinafter referred to as "ODCB-m." ODCB-m is sparged with dried nitrogen ($N_2$) for one hour before use. Dried nitrogen is obtained by passing nitrogen at <90 psig over $CaCO_3$ and SA molecular sieves. A sample solution is prepared by, using the autosampler, dissolving a polymer sample in ODCB-m at 4 mg/ml under shaking at 160° C. for 2 hours. 300 μL of the sample solution is injected into the column. The temperature profile of CEF is: crystallization at 3° C./min from 110° C. to 25° C., thermal equilibrium at 30° C. for 5 minutes (including Soluble Fraction Elution Time being set as 2 minutes), and elution at 3° C./min from 25° C. to 140° C. The flow rate during crystallization is 0.052 mL/min. The flow rate during elution is 0.50 mL/min. The IR-4 or IR-5 measurement (IR channel) channel data is collected at one data point/second.

The CEF column is packed with glass beads at 125 μm±6% (such as those commercially available from MO-SCI Specialty Products) with ⅛ inch stainless tubing according to U.S. 2011/0015346 A1. The internal liquid volume of the CEF column is between 2.1 mL and 2.3 mL. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 25.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

The % CEF fraction or CEF percentage of area above 94° C. is defined as the integral of the IR-4 or IR-5 chromatogram (baseline subtracted measurement channel) in the elution temperature ranging from 94.0 to 140.0° C. divided by the total integral from 25 to 140.0° C. according to the follow equation:

$$\% \text{ CEF fraction above } 94° \text{ C.} = \frac{\int_{94}^{140} IRdT}{\int_{25}^{140} IRdT} \times 100$$

where T is the elution temperature (from the calibration discussed above).

A linear baseline is calculated by selecting two data points: one before the polymer elutes, usually at a temperature of 25.5° C., and another one after the polymer elutes, usually at 118° C. For each data point, the detector signal is subtracted from the baseline before integration.

Differential Scanning Calorimetry (DSC)

The melting peaks and wt. % crystallinity are determined based on the following DSC technique. Baseline calibration of the TA Instrument's DSC Q1000 is performed by using the calibration wizard in the software. First, a baseline is obtained by heating the cell from −80° C. to 280° C. without any sample in the aluminum DSC pan. After that, sapphire standards are used according to the instructions in the wizard. Then about 1-2 mg of a fresh indium sample is analyzed by heating the sample to 180° C., cooling the sample to 120° C. at a cooling rate of 10° C./min followed by keeping the sample isothermally at 120° C. for 1 minute, followed by heating the sample from 120° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion.

Samples of polymer are pressed into a thin film at a temperature of 160° C. About 5 to 8 mg of sample is weighed out and placed in a DSC pan. A lid is crimped on the pan to ensure a closed atmosphere. The sample pan is placed in the DSC cell and then heated at a high rate of about 100° C./min to a temperature of 180° C. The sample is kept at this temperature for about 5 minutes. Then the sample is cooled at a rate of 10° C./min to −40° C., and kept isothermally at that temperature for 5 minutes. The sample is then heated at a rate of 10° C./min until melting is complete. The resulting enthalpy curves are analyzed. The cool curve heat of fusion (J/g) is calculated by integrating from the beginning of crystallization to −20° C. The second heating curve heat of fusion (J/g) is calculated by integrating from −20° C. to the end of melting. Weight Percent crystallinity (wt. % crystallinity) may be measured from the heat of fusion and its normalization to the heat of fusion of 100% crystalline polymer. Specifically, the wt. % crystallinity=($\Delta$Hf*100%)/292, wherein 292 J/g is the literature value used for a 100% crystalline PE Tensile Properties of Thin Plastic Sheeting—ASTM D882

The tensile tests measure the properties of a film when tested under uniaxial extension. Properties include yield strength and yield strain, tensile strength and tensile strength at break, strain at break, energy to break (sometimes referred to as toughness) and secant modulus. The secant modulus is measured at a specified strain and is the ratio of the stress at the specified strain to the specified strain, as determined from the load—extension curve.

The film is conditioned for at least 40 hours after film production at 23° C. (+/−2° C.) and 50% R.H (+/−10) as per ASTM standards. Standard testing conditions are 23° C. (+/−2° C.) and 50% R.H (+/−10) as per ASTM standards.

Tensile test strips are cut from a sheet in (if applicable) the machine and cross directions (MD and CD). Strips are 1 inch wide by approximately 8 inches long. For standard tensile tests the samples are loaded onto a tensile testing frame using line grip jaws (flat rubber on one side of the jaw and a line grip the other) set at a gauge length (line grip to line grip distance) of 2 inches. The samples are then strained at a crosshead speed of 20 inches/min. From the resulting load-displacement curve the yield strength and yield strain, tensile strength and tensile strength at break, strain at break and energy to break can be determined. In addition, the elastic modulus and secant modulus (at a given strain) can be determined.

Protrusion Puncture Resistance of Stretch Wrap Film—ASTM D5748

The Puncture test determines the resistance of a film to the penetration of a probe at a standard low rate, single test velocity. The film is conditioned for at least 40 hours after film production at 23° C. (+/−2° C.) and 50% Relative Humidity (R.H.) (+1-10) as per ASTM standards. Standard testing conditions are 23° C. (+/−2° C.) and 50% R.H. (+/−10) as per ASTM standards.

Puncture is measured on a tensile testing machine. Square specimens are cut from a sheet to a size of 6 inches by 6 inches. The specimen is clamped in a 4 inch diameter circular specimen holder and a puncture probe is pushed into the centre of the clamped film at a cross head speed of 10 inches/minute. We offer two options for the test probe. The Dow test method deviates from the ASTM standard in that the probe used is a 0.5 inch diameter polished steel ball on a 0.25 inch diameter support rod. In contrast, the ASTM test method uses the 0.75 inch diameter, pear shaped Teflon coated probe specified in D5748. There is an approximate 12 inch maximum travel length to prevent damage to the test fixture. There is no gauge length; prior to testing the probe is as close as possible to, but not touching, the specimen. A single thickness measurement is made in the centre of the specimen. For each specimen, the maximum force, force at break, penetration distance, energy to break and puncture strength (energy per unit volume of the sample) is determined. A total of 5 specimens are tested to determine an average puncture value. The puncture probe is cleaned using a "Kim-wipe" after each specimen.

Stretch Hooder 100/75 Test

A film sample of dimensions 100 mm×25 mm and given thickness was used for the stretch hooder 100/75 test. The film sample was stretched to 100% elongation at a speed of 1000 mm/min using Instron 5581 mechanical testing system. When 100% elongation was reached, film sample was kept in this position for 15 seconds and then returned back to 75% elongation at a speed of 1000 mm/min. After waiting at this elongation for 5 minutes, load on the sample was measured and recorded as holding force. Afterwards, the Instron grips were returned to zero elongation and film sample was removed. After 24 hours of waiting at ambient conditions, final length of the film was measured and permanent deformation was calculated using the following equation.

$$\% \text{ permanent deformation} = \frac{\text{final length} - \text{initial length}}{\text{initial length}} \times 100$$

Elastic recovery was calculated as

Elastic recovery=100−permanent deformation 5 specimens were used for each sample and average values for holding force, permanent set and elastic recovery are reported.

Stretch Hooder 60/40 Test

This test is very similar to stretch hooder 100/75 test except that initially the film sample is stretched to 60% elongation at a speed of 1000 mm/min, held there for 15 seconds and then returned to 40% elongation at same speed. Holding force was measured after waiting for 5 minutes at 40% elongation. The procedure for measuring permanent set and elastic recovery are exactly the same as the stretch hooder 100/75 test method.

Unless otherwise indicated, the disclosure of any ranges in the specification and claims are to be understood as including the range itself and also anything subsumed therein, as well as endpoints.

It will be apparent to those skilled in the art that modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

The invention claimed is:

1. A stretch hood or stretch label multilayer film comprising a first skin layer, a second skin layer, and a core layer disposed between the first skin layer and the second skin layer, wherein:
   the first skin layer, the second skin layer, or both independently comprise at least 50 wt. % of a linear low density polyethylene (LLDPE) resin (skin LLDPE resin), wherein the skin LLDPE resin exhibits each of the following properties:
      a Crystallization Elution Fractionation (CEF) fraction of less than 8% above an elution temperature of 94° C.; and
      a melt index ($I_2$) of 0.1 to 2.0 g/10 min when measured according to ASTM D 1238 at a load of 2.16 kg and temperature of 190° C.;
   and
   the core layer comprises a polyethylene resin having wt. % crystallinity from 10% to 40%, a melt index ($I_2$) of 0.1 to 2.0 g/10 min measured according to ASTM D 1238 at a load of 2.16 kg and a temperature of 190° C., and a single melting peak as measured by differential scanning calorimetry.

2. The stretch hood or stretch label multilayer film of claim 1, wherein the core polyethylene resin has a wt. % crystallinity of 20% to 40%, and a single melting peak within a melting temperature range from 50° C. to 105° C.

3. The stretch hood or stretch label multilayer film of claim 1, wherein the skin LLDPE resin has a single melting peak as measured by differential scanning calorimetry, wherein the single melting peak is within a melting temperature range from 102° C. to 120° C.

4. The stretch hood or stretch label multilayer film of claim 1, wherein the CEF fraction of the skin LLDPE resin is less than 6% above an elution temperature of 94° C.

5. The stretch hood or stretch label multilayer film of claim 1, wherein the skin LLDPE resin has a molecular weight distribution (MWD) from 2.0 and 3.5, wherein MWD is defined as Mw/Mn with Mw being a weight average molecular weight and Mn being a number average molecular weight.

6. The stretch hood or stretch label multilayer film of claim 1, wherein the skin LLDPE resin has a density of from 0.905 to 0.925 g/cm³.

7. The stretch hood or stretch label multilayer film of claim 1, wherein the first skin layer, the second skin layer, or both independently comprises one or more of low density polyethylene (LDPE), ethylene vinyl acetate (EVA), or an additional LLDPE resin.

8. The stretch hood or stretch label multilayer film of claim 7, wherein the LDPE, EVA, the additional LLDPE resin, or combinations thereof are present in the first skin layer, the second skin layer, or both at levels of up to 50 wt. %.

9. The stretch hood or stretch label multilayer film of claim 1, wherein the skin LLDPE resin has a melt flow ratio, $I_{10}/I_2$, of 5.5 to 8.0, wherein melt index ($I_{10}$) is measured according to ASTM D 1238 at a load of 10 kg and a temperature of 190° C.

10. The stretch hood or stretch label multilayer film of claim 1, wherein the core polyethylene resin is an LLDPE resin having a density from 0.870 to 0.907 g/cm³.

11. The stretch hood or stretch label multilayer film of claim 1, wherein the first skin layer, the second skin layer, or both independently comprise antiblock agents, slip agents, or combinations thereof.

12. The stretch hood or stretch label multilayer film of claim 1, wherein the first skin layer and second skin layer have a combined thickness of 10 to 50% of a thickness of the multilayer film, wherein the multilayer film has a thickness from 30 to 150 μm.

13. The stretch hood or stretch label multilayer film of claim 1, wherein when the multilayer film is a stretch hood, the thickness of the multilayer film is from 60 microns to 150 microns, and when the multilayer film is a stretch label, the thickness of the multilayer film is from 30 to 100 microns.

14. The stretch hood or stretch label multilayer film of claim 1, wherein the multilayer film exhibits a permanent deformation less than 45% as measured by a stretch hooder 60/40 test and a permanent deformation less than 50% as measured by a stretch hooder 100/75 test, when the multilayer film has an overall thickness of 100 μm with the first skin layer and the second skin layer each having a thickness of 20 μm.

* * * * *